United States Patent [19]

Ono et al.

[11] Patent Number: 4,817,708
[45] Date of Patent: Apr. 4, 1989

[54] VENTILATING UNIT FOR DRAWING AND EXHAUSTING AIR

[75] Inventors: Nobuyuki Ono, Kakamigahara; Toshikazu Ogata, Nagoya, both of Japan

[73] Assignee: Kabushiki Kaisha Toshiba, Kawasaki, Japan

[21] Appl. No.: 166,840

[22] Filed: Feb. 25, 1988

Related U.S. Application Data

[63] Continuation of Ser. No. 895,852, Aug. 12, 1986, abandoned.

[30] Foreign Application Priority Data

Aug. 19, 1985 [JP] Japan ................................ 60-181332
Aug. 19, 1985 [JP] Japan ................................ 60-181333
Aug. 19, 1985 [JP] Japan ........................... 60-126351[U]

[51] Int. Cl.⁴ ............................................. F24H 3/02
[52] U.S. Cl. ..................................... 165/54; 98/33.1; 165/166
[58] Field of Search ................... 165/54, 166; 98/33.1

[56] References Cited

U.S. PATENT DOCUMENTS

| 4,048,811 | 9/1977 | Ito et al. ........................... 98/33.1 X |
| 4,512,393 | 4/1985 | Maendel ............................... 165/54 |
| 4,550,773 | 11/1985 | Martin .................................. 165/54 |
| 4,563,126 | 1/1986 | Kobayashi et al. ............... 165/54 X |
| 4,596,284 | 6/1986 | Honmann ...................... 98/33.1 X |

FOREIGN PATENT DOCUMENTS

| 0091643 | 4/1982 | European Pat. Off. . |
| 0141376 | 10/1983 | European Pat. Off. . |
| 2506906 | 12/1982 | France ................................. 165/54 |
| 26055 | 2/1979 | Japan .................................. 165/54 |
| 153138 | 9/1982 | Japan .................................. 165/54 |
| 55637 | 4/1983 | Japan .................................. 165/54 |
| 158438 | 9/1983 | Japan .................................. 165/54 |

Primary Examiner—Steven E. Warner
Attorney, Agent, or Firm—Cushman, Darby & Cushman

[57] ABSTRACT

A ventilator has a body in which an air-intake passage for introducing outdoor-air indoors and an air-discharge passage for introducing indoor-air outdoors are defined. An air-intake fan and an air-discharge fan are arranged in the passages, respectively. A filter is provided in the air-intake passage to filtrate air flowing through the air-intake passage. The flow resistance in the air-discharge passage is set higher than that in the air-intake passage.

7 Claims, 3 Drawing Sheets

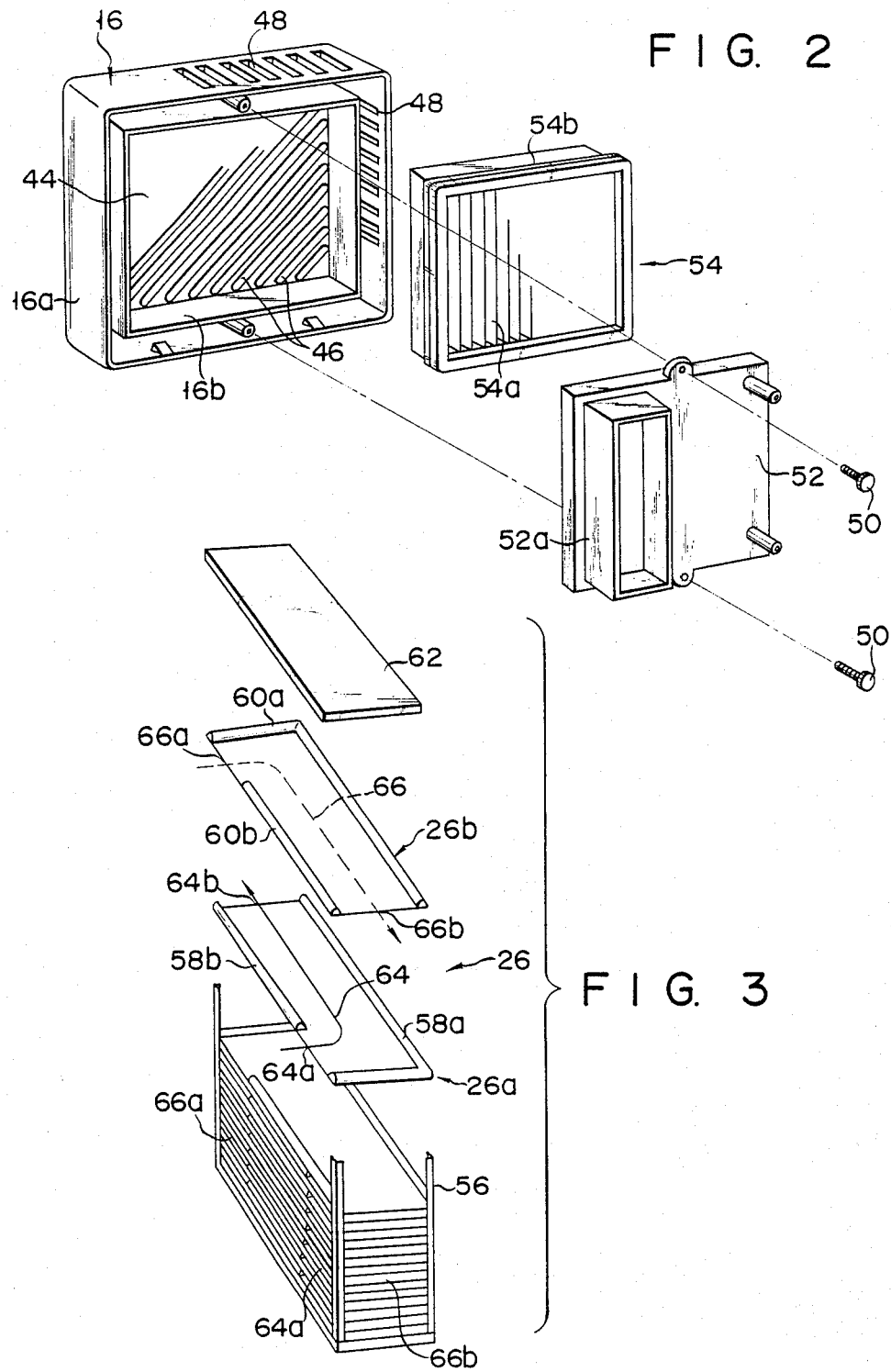

VENTILATING UNIT FOR DRAWING AND EXHAUSTING AIR

This is a continuation of application Ser. No. 895,852, filed Aug. 12, 1986, now abandoned.

BACKGROUND OF THE INVENTION

This invention relates to a ventilator for drawing and discharging air, and more particularly to a ventilator provided with a filter for cleaning atmospheric air to be taken into the room.

A conventional ventilator for drawing and discharging air at the same time is of the type which takes air directly into the room through the air-intake passage. Therefore, the conventional ventilator is accompanied with the drawback that various dust particles such as sand and cement contained in the air or cedar pollens depending on the season are drawn indoors, a condition detrimental to the human health. These events pose great problems to a family suffering from hay fever or irritation from roadway dust. Recently, it has been proposed to arrange a filter to the air-intake passage of a ventilator in order to remove dust and pollen floating in the air.

With the proposed type of ventilator, the ventilating capacity itself is not obstructed even if the quantity of drawn air and that of discharged air get out of balance. The reason is as follows. Quantities of air corresponding to a difference between the amount of drawn air and that of discharged air flow into or out of the room through the various gaps or crevices. Where, however, the amount of discharged air exceeds that of incoming air, the outside air flows indoors through the room crevices. Even though, therefore, the air-intake passage of the ventilator is fitted with a filter for the object of eliminating dust particles or pollens contained in the atmosphere, the external air streams contaminated with the above-mentioned foreign matters tend to be directly carried indoors without being strained by the filter. Therefore, the conventional ventilator lacks the effect of providing a filter.

SUMMARY OF THE INVENTION

This invention has been accomplished in view of the above-mentioned circumstances, and is intended to provide a ventilator capable of preventing external air from flowing indoors through room crevices and always keeping indoor air quite clean.

To attain the above-mentioned object, the present invention provides a ventilator which comprises:

a ventilator body provided with an air-intake passage for introducing outdoor-air indoors and an air-discharge passage for introducing indoor-air out of doors;

a filter provided in said air-intake passage to filtrate air flowing through the air-intake passage;

an air-intake fan arranged in the air-intake passage to intake outdoor-air indoors through the air-intake passage;

an air-discharge fan arranged in the air-discharge passage to discharge indoor-air outdoors through the air-discharge passage;

drive means for driving the air-intake and discharge fans; and means for causing a larger amount of air to flow through the air-intake passage than through the air-discharge passage.

BRIEF DESCRIPTION OF THE DRAWINGS

FIGS. 1 to 3 illustrate a ventilator according to a first embodiment of the present invention:

FIG. 1 is a sectional view of the ventilator,

FIG. 2 is an exploded perspective view of a decorative cover of the ventilator, and FIG. 3 is an exploded perspective view of a heat exchanger;

DETAILED DESCRIPTION OF THE PREFERRED EMBODIMENTS

Embodiments of the present invention will now be described in detail with reference to the accompanying drawings.

Figure 1:
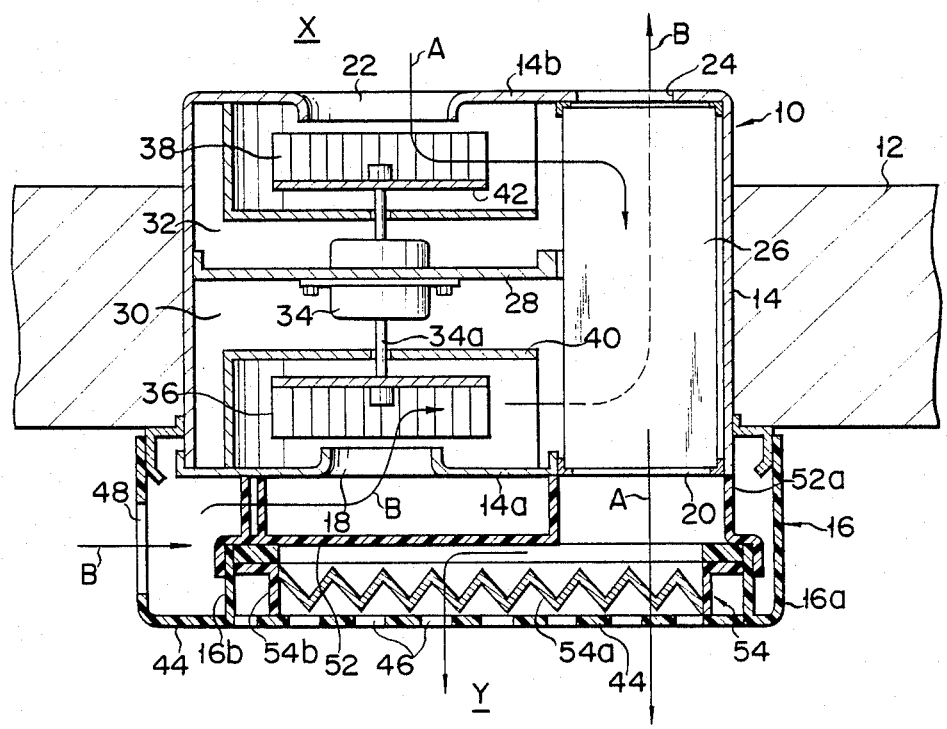

Referring to FIG. 1, a ventilator is provided with a body 10. Body 10 includes box-shaped casing 14 which is fixed to room wall 12 and has front wall 14a facing the indoor area Y and rear wall 14b facing the outdoor area X, and decorative cover 16 detachably fitted to casing 14 so as to cover front wall 14a.

Round indoor-air ventilating port 18 is formed in the left side portion of front wall 14a of casing 14. Rectangular outdoor-air ventilating port 20 is formed in the right side portion of front wall 14a. Formed in rear wall 14b are round outdoor-air inlet port 22 concentric with port 18, and also rectangular indoor-air outlet port 24 which faces port 20. Heat exchanger 26 described later is arranged in the right side portion in casing 14 to be removable from the casing through port 20. The remaining space of casing 14 is divided by partition wall 28 into air-discharge chamber 30 communicating with port 18 and air-intake chamber 32 communicating with port 22. Namely, partition wall 28 is provided between ventilating port 18 and inlet port 22 in parallel with front wall 14a and rear wall 14b of casing 14.

Motor 34 is fixed to partition wall 28. Motor 34 is provided with rotational shaft 34a coaxially extending with port 18 and inlet port 22. Shaft 34a protrudes into air-discharge chamber 30 at one end and into air-intake chamber 32 at the other end. Air-discharge fan 36 is provided in chamber 30. Fan 36 is fixed to one end of shaft 34a and faces ventilating port 18. Air-intake fan 38 is provided in chamber 32. Fan 38 is fixed to the other end of shaft 34a and faces inlet port 22. Fans 36, 38 have the same diameter and the same air-conducting capability. Helical fan case 40 is provided in chamber 30 so as to cover fan 36 and port 18. Helical fan case 42 is provided in chamber 32 so as to cover fan 38 and port 22.

As seen from FIGS. 1 and 2, decorative cover 16 includes rectangular outer frame 16a, one end of which is closed by front plate 44, and rectangular inner frame 16b which is fixed to front plate 44 and is set inside of outer frame 16a. Formed in front plate 44 are a large number of outdoor-air outlet ports 46 open to the inside of inner frame 16b. A large number of indoor-air inlet ports 48 are formed in outer frame 16a. Decorative cover 16 is fitted to casing 14 in such a manner that outer frame 16a is engaged at the other end with casing 14. Front plate 44 faces front wall 14a of casing 14 at a proper distance. Inner cover 52 is fitted to decorative cover 16 by means of screws 50 to close the opening of inner frame 16b. Inner cover 52 comprises cylindrical portion 52a extending toward casing 14. This cylindrical portion 52a has the same cross sectional shape as the shape of outdoor-air ventilating port 20. When decorative cover 16 is fitted to casing 14, cylindrical portion 52a communicates with port 20. Consequently, air outlet ports 46 communicate with outdoor-air ventilating port 20 through the interior of inner frame 16b and the interior of cylindrical portion 52a. Indoor-air inlet ports 48 communicate with ventilating port 18 through a space defined between outer and inner frames 16a and 16b.

Filter 54 is detachably fitted in inner frame 16b, and clamped between front plate 44 of decorative cover 16 and inner cover 52. Filter 54 comprises undulated filtering member 54a and support frame 54b. Filtering member 54a has relatively fine openings so as to trap dust or cedar pollens. In this embodiment, the particle-trapping capacity of filter 54a is defined to fall within the range whose upper limit is set to [at most, about 90% for dust particles having a diameter of 5 microns or more]. It will be noted that the definition in the brackets represents the customarily accepted filter capacity.

Heat exchanger 26 involved in the ventilator performs heat exchange by causing outdoor and indoor-air streams to flow in opposite directions. The details of heat exchanger 26 are shown in FIG. 3. Heat exchanger 26 comprises two kinds (26a, 26b) of heat-exchanging elements and support-frame 56. Element 26a is formed of a rectangular board. Ridges 58a, 58b are provided along the edges of the rectangular board. Similarly, element 26b is formed of a rectangular board. Ridges 60a, 60b extend along the edges of the rectangular board. Heat exchanger 26 is constructed by laminating heat-exchanging elements 26a, 26b alternately within support frame 56 with cap 62 placed at the top of the laminated assembly. The alternate lamination of a large number of heat-exchanging elements provides indoor-air passages 64 (indicated by a solid line) and outdoor-air passages 66 (indicated by a broken line). Heat-exchanging elements 26a, 26b, support frame 56 and cap 62 are all prepared from washable material, for example, synthetic resin.

When heat exchanger 26 is set in casing 14, inlets 64a of all indoor-air passages 64 communicate with air-discharge chamber 30, and outlets 64b of passages 64 communicate with indoor-air outlet port 24. Inlets 66a of outdoor-air passages 66 communicate with air-intake chamber 32, and outlets 66b of passages 66 communicate with outdoor-air ventilating port 20. Heat exchanger 26 has substantially the same cross sectional shape as outdoor-air ventilating port 20. When, therefore, decorative cover 16 is removed from casing 14, heat exchanger 26 can be taken out through outdoor-air ventilating port 20.

With the ventilator constructed as mentioned above, ventilator body 10 comprises air-intake passage A extending through outdoor-air inlet port 22, air-intake chamber 32, outdoor-air passages 66 of heat exchanger 26, outdoor-air ventilating port 20, filter 54 and outdoor-air outlet ports 46, and air-discharge passage B extending through indoor-air inlet ports 48, indoor-air ventilating port 18, air-discharge chamber 30, indoor-air passages 64 of heat exchanger 26 and indoor-air outlet port 24. Flow resistance air-discharge passage B is set to be greater than that in air-intake passage A. As a result, outdoor-air is designed to be carried indoors in a larger amount than indoor-air discharged outdoors. The process of taking a larger amount of air streams indoors than that of air streams discharged outdoors, that is, the process of increasing the flow resistance in air-discharge passage B comprises the steps of narrowing a gap between the front wall 14a of a casing 14 and inner cover 52 to reduce the cross sectional area of air-discharge passage B and making the diameter or width of indoor-air inlet ports 48 smaller than that of outdoor-air outlet ports 46.

The operation of the ventilator constructed as described above will be described.

When motor 34 is supplied with power, air-intake fan 38 and air-discharge fan 36 are rotated. In accordance with the rotation of fan 38, outdoor-air is sucked into ventilator body 10 through inlet port 22 and flows through air-intake passage A. Thereafter, the outdoor-air is discharged into the room Y from outlet ports 46. While outdoor-air is carried through filter 54, filtering member 54a traps sands, dust particles and pollens floating in the outdoor-air which have larger particle sizes than 5 microns. Coarse dust particles contained in outdoor-air are trapped while passing through heat exchanger 26. As a result purified outdoor-air is brought indoors Y. While air is being sucked, indoor-air is taken into ventilator body 10 through inlet ports 48 by the action of air-discharge fan 36, and discharged outdoors X from outlet port 24 through air-discharge passage B. Heat exchange takes place between indoor and outdoor-air streams while they flow through heat exchanger 26.

Figure 4:
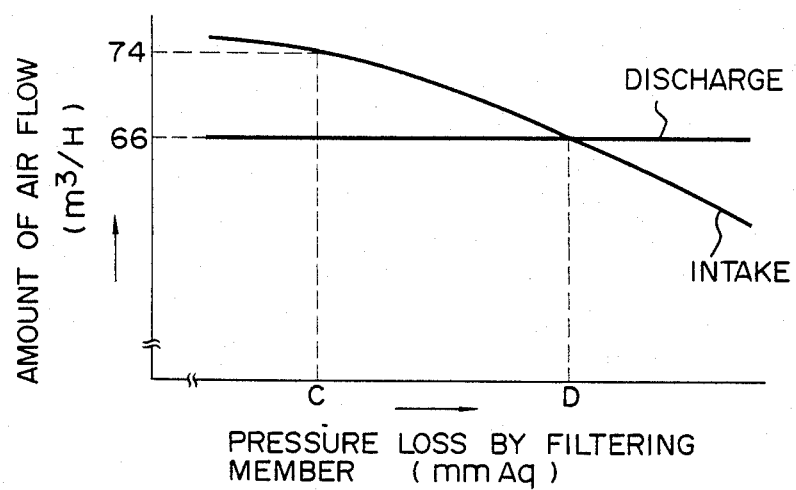
FIG. 4 is a view showing the relationship between the air volume handled by the ventilator and the pressure loss of the filter.

The above-mentioned ventilator operation is designed so as to take in a larger volume of air than is discharged to the outside. When, therefore, the room has crevices, air retained indoors Y is sent forth outdoors X through the crevices, thereby preventing outdoor-air from being brought indoors Y through the crevices. When, as shown in FIG. 4, the amount of discharged air is set at 66 m$^3$/H, the amount of intaken air at point C stands at 74 m$^3$/H. In this case, an air volume of 8 m$^3$/H, a difference between the amount of discharged air and that intaken air is let to be leaked outdoors through the room crevices. Consequently air intaken indoors Y from outdoors X is all cleaned by filter 54, thus preventing indoors Y from being contaminated by dust particles and pollen and preserving a sanitary room condition.

When the filtering member 54a gets clogged, its capacity to trap particulate matter is lessened, and it causes increased pressure differential across the filter, reducing the amount of air that is taken in. Therefore, if a determination is experimentally made under practical operation conditions of the period extending from the point of time at which filtering member 54a begins to be clogged to the point of time D (FIG. 4) at which the amount of intaken air equals that of discharged air, the operator can be reliably informed of the time when the used filter should be changed for a fresh one. This process ensures a more reliable notice of the time when the filter needs changing than when said time of change is judged by the cleanness of filter member 54a.

Minute cigarette smoke particles are generated in indoor-air. In such case, it will be meaningless to try to eliminate dust particles much finer than those floating indoors by means of filter 54. Filtering members 54a has to be formed of tremendously fine mesh in order to reliably trap extremely fine dust particles. This process has a drawback in that a greater flow resistance is encountered in ventilation. In the embodiment, the upper limit of the dust-trapping capacity of filtering member 54a is let to fall within the range in which it is possible to trap sands, dust particles, pollens, and other particles having a larger particle size than 5 microns, thereby suppressing the occurrence of extreme ventilation resistances.

Heat exchanger 26 is detachably held in casing 14 and prepared from washable material such as synthetic resin. Therefore, when heat exchanger 26 is taken out of casing 14 and washed with water, coarse dust particles deposited on heat exchanger 26 can be readily removed. Consequently, coarse dust particles trapped by heat exchanger 26 are prevented from being brought to filter 54. Thus, deposition of coarse dust particles on the heat exchanger raises no difficulties.

Figure 5:
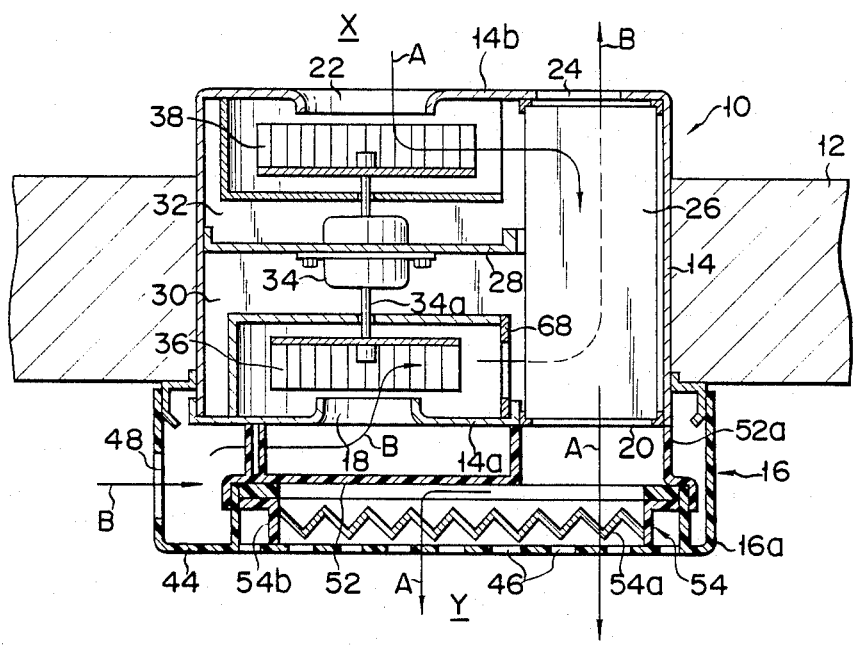
FIG. 5 is a sectional view of a ventilator according to a second embodiment of the invention.

It will be noted that present invention is not limited to the above-mentioned embodiment, but that the invention can be applied in various modifications within the scope and object of the invention. For instance, the means for increasing flow resistance in the air-discharge passage compared to the air-intake passage can be attained by resistance plate 68 disposed in air passage B. Further, the means for enabling air to be intaken in a larger amount than when discharged need not be limited to the step of varying the magnitude of flow resistance in the discharge-air passage. Rather, as shown in FIG. 5, it is possible to apply air-intake fan 38 having a larger diameter and capable of sending forth a larger amount of air than air-discharge fan 36. Heat exchanger 26 need not be limited to the aforementioned opposite-flow type, but may be any other type, for example, a perpendicularly intersecting flow type or parallel flow type.

What is claimed is:

1. A ventilating unit comprising:
 a ventilator body provided with an air-intake passage for introducing outdoor-air indoors and an air-discharge passage for introducing indoor-air outdoors;
 a filter provided in said air-intake passage, to filter air flowing through the air-intake passage;
 an air-intake fan arranged in said air-intake passage, to force outdoor-air indoors through said air-intake passage;
 an air-discharge fan arranged in said air-discharge passage, to force indoor-air outdoors through said air-discharge passage;
 drive means for driving said air-intake fan and air-discharge fan;
 a heat exchanger provided in both said air-intake passage and said air-discharge passage so as to be detachable from the ventilator body for cleaning, for exchanging heat between air streams flowing through said air-intake passage and said air-discharge passage and for trapping coarse dust particles in the air stream flowing through the air-intake passage, the heat exchanger being located toward an outdoor-facing portion of the ventilator with respect to said filter, and having a number of heat-exchanging elements arranged in a spaced relation, and a frame holding the heat-exchanging elements, said heat-exchanging elements and frame being made of material which can be washed with water; and
 means for causing a larger amount of air to flow through said air-intake passage than through said air-discharge passage so as to prevent a negative air pressure from developing in a room for which said ventilating unit is installed, thereby preventing unfiltered outdoor-air from being introduced indoors through gaps and room crevices.

2. The ventilator according to claim 1, wherein said air-intake fan has an air-forcing capacity higher than that of said air-discharging fan, and constitutes said causing means.

3. The ventilator according to claim 1, wherein said filter has a particle-trapping capacity which is, at most, about 90% for dust particles having a diameter of 5 microns or more.

4. The ventilator according to claim 1, wherein said ventilator body comprises a box-shaped casing having a front wall located indoors and a rear wall located outdoors to face the front wall, and a decorative cover detachably secured to said casing to cover the front wall, and said filter is detachably attached to the decorative cover.

5. The ventilator according to claim 1, wherein said causing means includes means for making said air-discharge passage more resistant to airflow than said air-intake passage.

6. The ventilator according to claim 5, wherein said air-discharge passage has a section having a smaller cross section than that of said air-intake passage, said section forming said means for making said air-discharge passage more resistant.

7. The ventilator according to claim 5, wherein said means for making said air-discharge passage more resistant has a resistance plate provided in said air-discharge passage.

* * * * *